Dec. 15, 1942.　　J. W. JUVINALL　　2,304,926
APPARATUS AND METHOD FOR SEVERING GLASS TUBING
Filed Dec. 24, 1940　　4 Sheets-Sheet 1

INVENTOR
J. W. JUVINALL
BY Emery Robinson
ATTORNEY

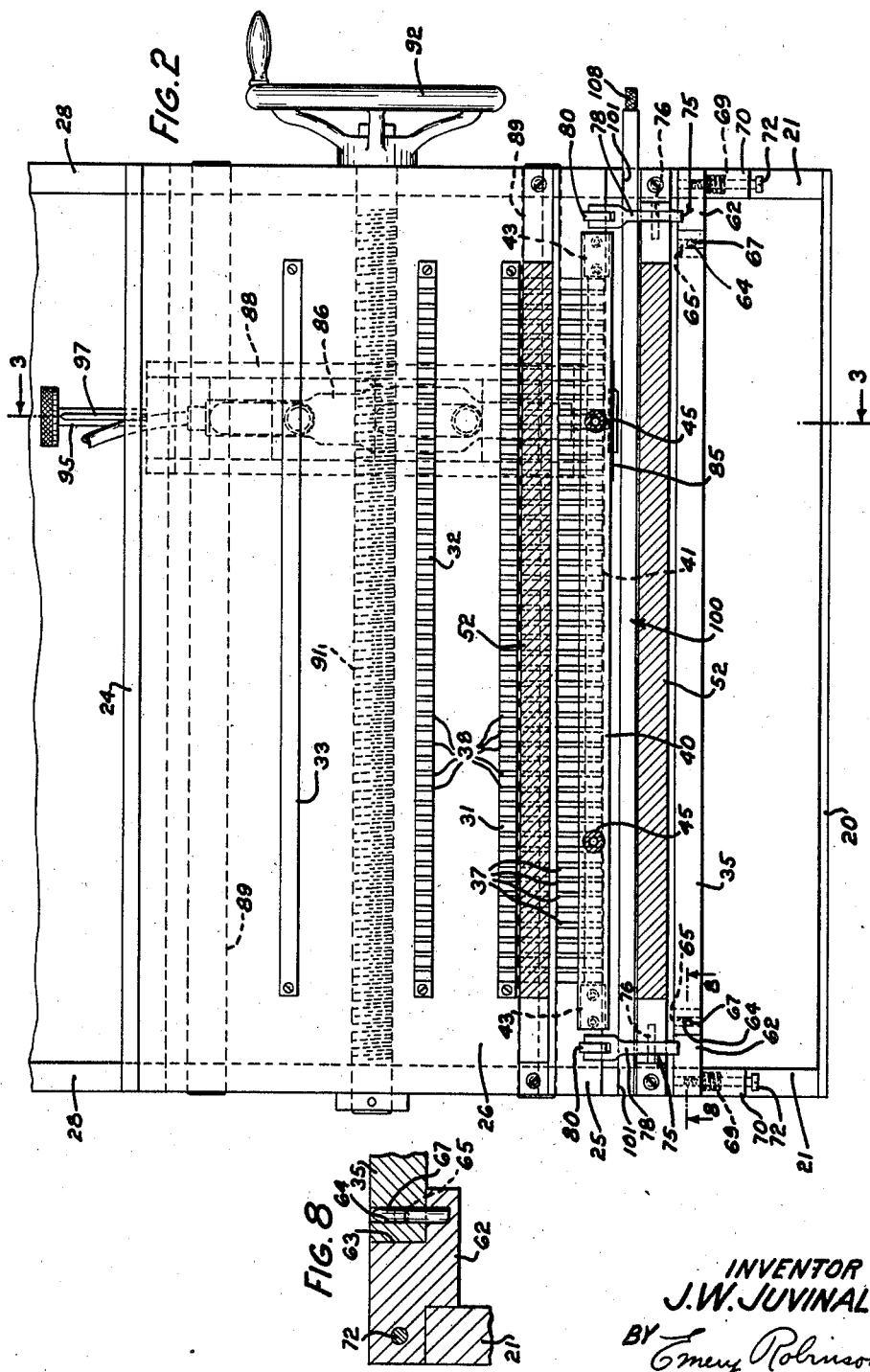

Dec. 15, 1942.  J. W. JUVINALL  2,304,926
APPARATUS AND METHOD FOR SEVERING GLASS TUBING
Filed Dec. 24, 1940  4 Sheets-Sheet 3
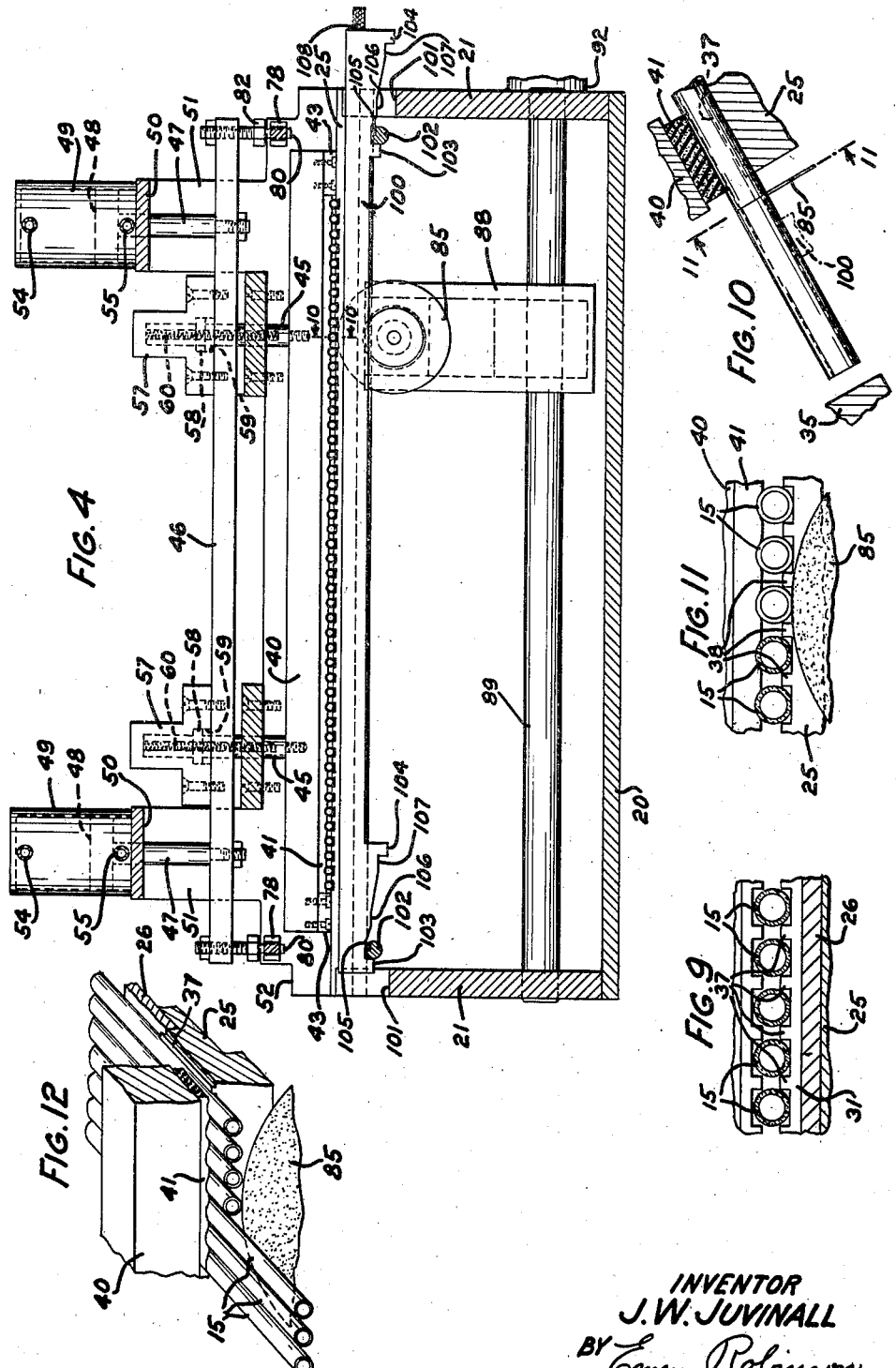
INVENTOR
J. W. JUVINALL
BY Emery Robinson
ATTORNEY Dec. 15, 1942. J. W. JUVINALL 2,304,926
APPARATUS AND METHOD FOR SEVERING GLASS TUBING
Filed Dec. 24, 1940 4 Sheets-Sheet 4
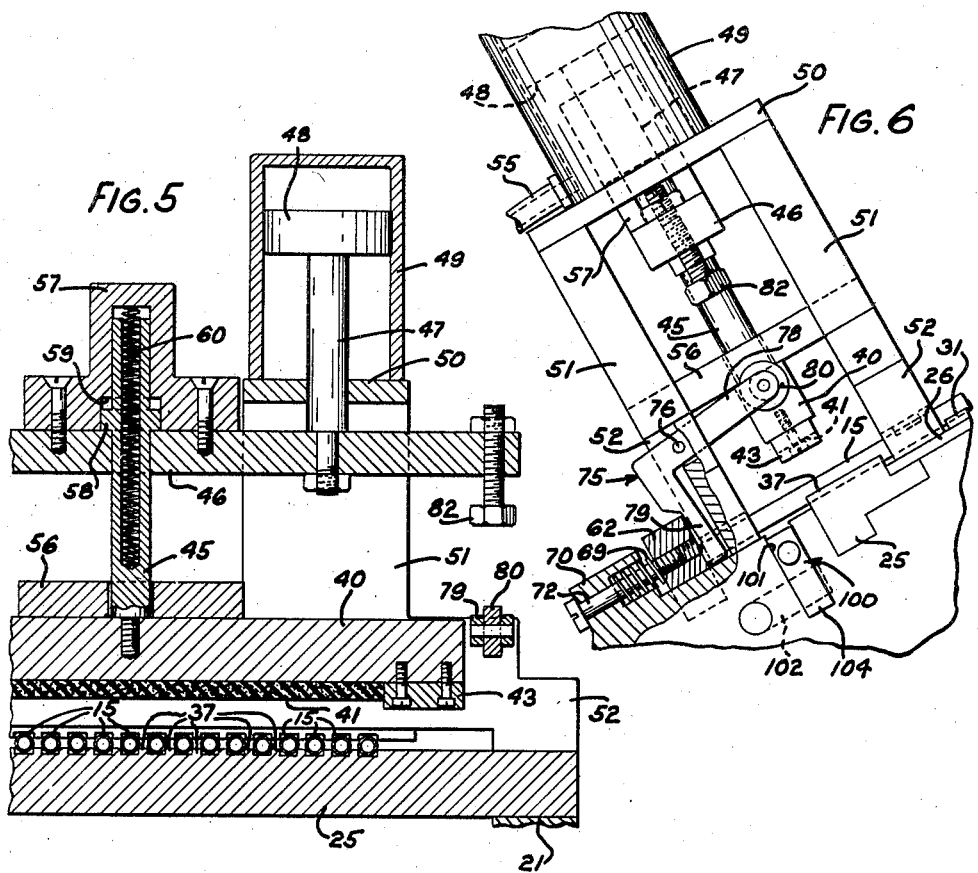
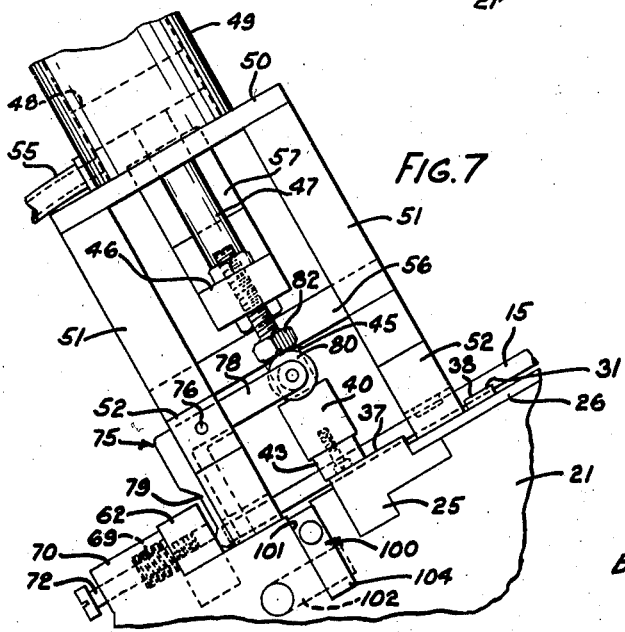
INVENTOR
J. W. JUVINALL
BY Emery Robinson
ATTORNEY Patented Dec. 15, 1942

2,304,926

UNITED STATES PATENT OFFICE 2,304,926

APPARATUS AND METHOD FOR SEVERING GLASS TUBING

James W. Juvinall, La Grange Park, Ill., assignor to Western Electric Company, Incorporated, New York, N. Y., a corporation of New York Application December 24, 1940, Serial No. 371,515

17 Claims. (Cl. 49—48)

This invention relates to a method of and apparatus for severing materials, and more particularly to a method of and apparatus for severing glass tubing into tubular blanks of uniform length.

Objects of the invention are to provide a simple, inexpensive and efficient method and apparatus for severing glass tubing or the like.

In accordance with the above objects, one embodiment of the invention contemplates the provision of a method of and apparatus for severing glass tubing, in which a plurality of glass tubes are placed on an inclined support, upon which they are endwise movable by gravity against a retractable stop, the support being adapted to maintain the tubes in parallel relationship and in a common plane. The tubes are clamped to the support by means of a rubber faced clamping bar, after which the stop is retracted. A thin cutting wheel rotating at high speed is then propelled across the tubes to "nick" each of them, the resulting vibration of the tubes being sufficient to cause each of them to break transversely thereof at the point where it is "nicked."

Other features and advantages of the invention will become apparent from the following detailed description when read in conjunction with the accompanying drawings, in which Fig. 1 is a side elevational view of an apparatus embodying the invention and by means of which the method may be practiced;

Fig. 2 is an enlarged fragmentary plan section taken on line 2—2 of Fig. 1;

Fig. 4 is an enlarged sectional view taken on line 4—4 of Fig. 1;

Fig. 5 is an enlarged fragmentary sectional view taken on line 5—5 of Fig. 1, but with the clamping bar shown in its elevated position;

Figs. 6 and 7 are enlarged fragmentary elevational views showing the two positions of the clamping bar and the associated mechanisms;

Fig. 8 is an enlarged detail section taken on line 8—8 of Fig. 2;

Fig. 9 is an enlarged fragmentary section taken on line 9—9 of Fig. 3;

Fig. 10 is an enlarged fragmentary sectional view taken on line 10—10 of Fig. 4;

Fig. 11 is a fragmentary sectional view taken on line 11—11 of Fig. 10, and

Fig. 12 is a fragmentary perspective view of the tube clamping and severing mechanisms.

Figure 1:
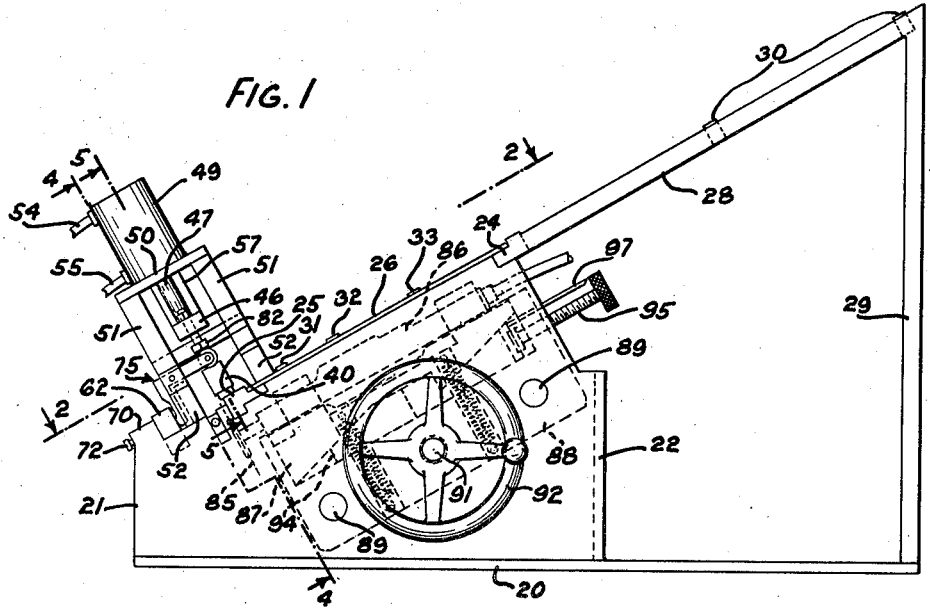

It will be noted that the glass tubes, which are designated in the drawings by the numeral 15, have been omitted from Figs. 1 and 2, but have been shown in the other views.

Figure 3:
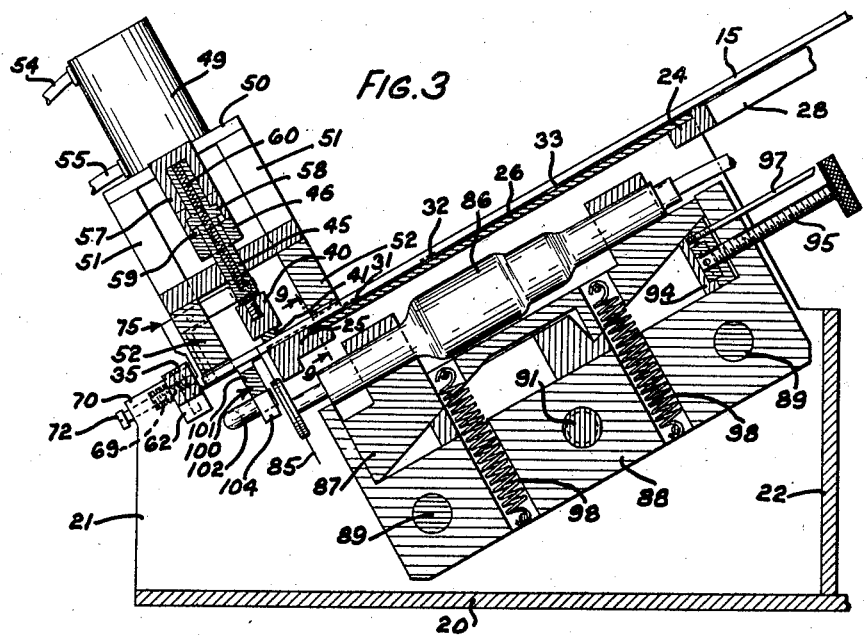
Fig. 3 is a vertical sectional view taken on line 3—3 of Fig. 2.

The apparatus illustrated in the drawings comprises a box-like supporting frame consisting of a bottom plate 20, two side walls 21—21 and a rear wall 22. The upper edges of the side walls are inclined, as shown in Figs. 1 and 3, and are notched at their rear ends to accommodate a cross bar 24, which is rigidly secured to the side walls. A second cross bar 25 is similarly attached to the side walls near the forward ends thereof and an inclined cover plate 26 extends from the rear cross bar to the front cross bar so as to span the opening therebetween. Two inclined bars 28—28 (Figs. 1 and 2) are secured to and extend rearwardly from the rear cross bar 24 in line with the side walls 21, and their upper surfaces are substantially flush with the upper surface of the cover plate. At their rear ends, the inclined bars are supported by vertical standards 29—29. Cross bars 30—30 extend between and are secured to the inclined bars.

Three transverse metal strips 31, 32 and 33 are attached to the upper surface of the cover plate 26 and these strips, together with the cross bars 24, 25 and 30, constitute an inclined work support adapted to accommodate a series of the glass tubes 15 which are arranged transversely of the cross bars. This support is preferably inclined just sufficiently to insure that the tubes will normally slide downwardly thereof by gravity until the forward ends of the tubes abut a stop bar 35 disposed parallel to and spaced from the front edge of the front cross bar 25. This latter bar has on its upper surface a series of spaced transverse guiding ribs 37, 37 and the transverse strips 31 and 32 have similarly spaced transverse ribs 38, 38 for maintaining the tubes in spaced relationship, as best shown in Figs. 5, 9 and 11. These guiding ribs are spaced apart a sufficient distance to compensate for the usual slight variations in the diameter of the tubes.

A reciprocatory clamping bar 40 is provided for clamping the tubes to the tube supporting bar 25. The underside of the clamping bar is faced with a soft rubber strip 41 in order to prevent crushing of the tubes when clamped and to compensate for variations in the outside diameter thereof. Spacer blocks 43—43 are provided at the ends of the clamping bar to limit the movement thereof toward the tube supporting bar.

The clamping bar 40 is attached to two plungers 45—45 (Figs. 3, 4 and 5) which are carried by a reciprocatory bar 46, hereinafter referred to as the clamp actuating bar. This clamp actuating bar is attached to piston rods 47—47 of two air operated pistons 48—48. The cylinders 49—49 of these pistons are attached by their bottom plates 50—50 to upstanding portions 51—51 of spaced parallel supporting plates 52—52 which extend between and are attached to the side walls 21 of the supporting frame. The piston rods 47 are bolted to the clamp actuating bar 46 so that the latter is adapted to be reciprocated by the pistons upon the introduction of compressed air into the cylinders alternately above and below the pistons through suitable air lines 54 and 55 connected to opposite ends of the cylinders. Referring particularly to Figs. 4 and 5, it will be seen that the reciprocatory movement of bar 46 is transmitted to clamping bar 40 through the plungers 45. Above the clamping bar, two cross straps 56—56 extend between and are secured to the supporting plates 52 to strengthen them. These cross straps also serve as stops for limiting the upward movement of the clamping bar.

The clamp actuating plungers 45 are slidably mounted in separate casings 57—57 attached to the upper side of clamp actuating bar 46 (Figs. 3, 4 and 5). The plungers are provided with integral annular flanges 58—58, which cooperate with cylindrical cavities 59—59 in the bottom of the casings to permit only a limited amount of relative movement between the plungers and bar 46. Coil springs 60—60, inserted between the plungers and their associated casings, serve to yieldably hold the plungers in their lowermost positions with respect to bar 46. This construction permits some additional downward movement of bar 46 after clamping bar 40 has been lowered to its clamping position. This additional movement of bar 46 is used to retract stop bar 35 from the forward ends of the tubes after the tubes have been firmly clamped to bar 25 and prior to each severing operation in the manner hereinafter described.

The stop bar is removably supported at its ends by slides 62—62, which are slidable along the upper surfaces of the side walls 21 of the supporting frame. As best shown in Fig. 8, each slide is cut away, as indicated at 63, to accommodate the stop bar and the latter is provided near each end with two transverse pin receiving holes 64 and 65, which intersect each other at right angles. Each slide 62 has an upstanding pin 67 which is receivable in one of the holes 64 and 65, whereby the stop bar is constrained to move with the slides. The stop bar is of rectangular cross section and the two cross sectional dimensions thereof are different so that by simply turning the stop bar 90°, the length of the parts severed from the tubes 15 may be changed.

The stop bar is yieldably held in its operative position by coil springs 69—69 interposed between the slides 62 and upstanding lugs 70—70 on the side walls 21 of the supporting frame. The coil springs encircle stop screws 72—72 which are slidable in the lugs 70 and are threaded into the slides, as best shown in Fig. 6. The heads of the stop screws engage the front surfaces of the lugs 70 to limit the rearward movement of the slides under the force of the springs, and thereby determine the operative position of the stop bar 35 which, in turn, determines the length of the parts severed from the tubes. By simply turning the stop screws 72, the operative position of the stop bar may be changed so as to increase or decrease the length of the severed parts.

Associated with each of the stop bar carrying slides 62 is a bell crank lever 75, which is pivotally mounted on a pin 76 in the front supporting plate 52, the latter being suitably slotted to permit oscillatory movement of the bell crank levers. Each of the levers comprises a rearwardly extending arm 78 and a depending arm 79 held in contact with the back surface of associated slide 62 by the weight of arm 78. Arm 78 carries a roller 80 disposed in the path of an adjustable bumper screw 82 carried by the clamp actuating bar 46. The bumper screws are adjusted to engage the rollers 80 immediately after the clamping bar has been lowered to its clamping position, so that the additional downward movement of clamp actuating bar 46 rocks the bell crank levers in a clockwise direction (Fig. 6), thus retracting the stop bar carrying slides to the position shown in Fig. 7. The stop bar is thus retracted or disengaged from the forward ends of the clamped tubes.

A rotary cutting wheel 85 is provided for "nicking" the tubes along a line parallel to and adjacent the front side of tube supporting bar 25. The cutting wheel is preferably composed of a suitable abrasive material, such as carborundum or the like, and is mounted on the shaft of a high speed air operated motor 86. The motor is mounted in a vertically movable carrier or slide 87, which, in turn, is mounted in a horizontally movable carriage 88. The carriage 88 is slidably supported on two horizontal guide rods 89—89, which extend between and are secured to the side walls 21 of the supporting frame. A horizontal threaded shaft 91 has a screw thread connection with the carriage 88 and is provided at one end with a hand wheel 92, by means of which the shaft may be rotated first in one direction and then in the other to move the carriage back and forth along the guide rods 89.

By means of a slidable wedge 94 (Fig. 3) disposed beneath the cutting wheel carrier 87, the cutting wheel is adjustable to compensate for wear on its cutting edge and to vary the depth of the cuts or "nicks" made in the glass tubes as the rotating cutting wheel is propelled along the underside of the tubes. An adjusting screw 95 is connected to the rear end of the wedge and is threaded in the rear wall of the horizontal carriage 88, so that by turning the adjusting screw, the wedge may be shifted to elevate or lower the cutting wheel. A pointer 97 is attached to the wedge so as to be movable therewith and cooperates with suitable calibrations on the head of the adjusting screw to facilitate making the required adjustments. The cutting wheel carrier is held down against the wedge by two coil springs 98—98.

An auxiliary combination tube supporting and stop bar 100 is slidably supported on bent pins 102—102 anchored in the side walls 21 of the supporting frame. As shown in Figs. 2 and 3, the bar 100 is disposed in front of and adjacent the path of the cutting wheel. Slots 101—101 are provided in the side walls 21 for slidably accommodating the bar 100, which is provided at each end with spaced depending projections 103 and 104 for cooperating with the supporting pins 102 to limit the endwise movement of the bar. Between the projections or stops 103 and 104, three stepped portions 105, 106 and 107 (Fig. 4) are provided, and a handle 108 is provided at one end of the bar for manually shifting it to any one of three positions. In the lowermost of these positions, the portions 105 of the bar rest on the supporting pins 102, as shown in Fig.

4, and the upper edge of the bar is below the plane of the upper surface of the tube supporting bar 25. This is hereinafter referred to as the inoperative position of bar 100, since in this position it performs no function in the operation of the apparatus. When this bar is shifted to an intermediate position, the portions 106 thereof rest upon the supporting pins and the upper edge of the bar is in the plane of the tube supporting surface of bar 25, as indicated in broken lines in Fig. 10. When in this intermediate position, the bar 100 serves as an auxiliary support for the forward ends of the tubes which may be used to advantage when making the final cuts, in which instances the portions of the tubes extending forwardly of the supporting bar 25 may out-weigh the remaining portions of the tubes and, therefore, require the auxiliary support to prevent sagging thereof when the clamping bar 40 is in its elevated position.

When the bar 100 is shifted toward the left (Fig. 4) to a position in which the portions 107 thereof rest upon the supporting pins 102, the upper edge of the bar is above the level of the tubes. Thus, when shifted to this uppermost position, the bar 100 is adapted to serve as an auxiliary stop which is engageable by the forward ends of the tubes when squaring off the forward ends thereof before cutting the first tubular blanks therefrom.

In the normal operation of the apparatus, the bar 100 remains in its lowermost or inoperative position except when making the final cut, prior to which time this bar is shifted to its intermediate position, wherein it serves as an auxiliary support for the forward end of the tubes, as explained above. The operation of the apparatus is as follows:

With the clamping bar 40 in its elevated position, as shown in Figs. 5 and 6, a plurality of glass tubes 15 are placed on the inclined support composed of the cross bars 24, 25 and 30 and the intermediate cross strips 31, 32 and 33. The force of gravity causes the tubes to slide down the inclined support until the forward ends thereof engage the stop bar 35. The rubber faced clamping bar 40 is then lowered by operation of the air cylinders 49, thus clamping the tubes to the front cross bar 25 of the inclined support, after which the stop bar is retracted by the bell crank levers 75 which are actuated by the clamp actuating bar 46 during its continued downward movement after the clamping bar has been lowered to its clamping position, as described above.

The cutting wheel 85, having been adjusted by means of adjusting screw 95 to "nick" or cut the tubes to the required depth, is rotated at a high speed by the air motor 86 and, while so rotating, the cutting wheel is propelled across the underside of the row of tubes by manually rotating threaded shaft 91 by means of handwheel 92. Each of the tubes is thus "nicked" on its underside along a line transversely of its axis and adjacent the front edge of the front supporting bar 25. Since the tubes are only yieldably clamped by the rubber faced clamping bar and are free or unconfined at their forward ends, the rotating cutting wheel causes the tubes to vibrate, particularly at their unconfined forward ends and adjacent the points where they are "nicked." This vibrating action causes the forward end portion of each tube to break off transversely of the axis of the tube and at the point where it is "nicked." Thus, a complete separation of the forward end portion of each tube is obtained without cutting completely through the tubes, but by simply "nicking" them and allowing the cutting wheel to vibrate them sufficiently to complete the separation. The severed tubular blanks may be collected in a suitable receptacle (not shown) which may be placed underneath the cutting wheel.

After the completion of the first cutting operation of the entire row of tubes, the clamp actuating bar 46 is elevated by operation of the air cylinders 49. This upward movement of the clamp actuating bar first allows the stop bar 35 to return to its operative position under the force of compression springs 69, and then elevates the clamping bar 40 to release the tubes. The released tubes slide downwardly against the stop bar, after which they are again clamped to the front supporting bar 25, the stop bar is again retracted, and the next cutting operation is performed in the same manner as described above, except that the cutting wheel is now propelled along the guide rods 89 in a direction opposite to the direction of movement thereof during the preceding cutting operation. The same cycle of operation is repeated for each succeeding cutting operation, except that for the final cutting operation the auxiliary supporting bar 100 is manually shifted to its intermediate position, wherein it serves as an auxiliary support for the forward ends of the tubes, as explained above.

By means of the adjusting screw 95, the cutting wheel may be adjusted whenever required, in order to compensate for wear on its cutting edge or to vary the depth of the cut. The required depth of the cut will, of course, depend upon the wall thickness of the tubes. Experiments have shown that for tubes having a wall thickness of .022" to .030", satisfactory results are obtained when the depth of the cut is approximately one-half of the wall thickness of the tube. The length of the tubular blanks produced by the apparatus may be changed either by turning the stop bar 35 ninety degrees (90°) as explained above, or by changing the operative position of the stop bar by means of the adjusting screws 72.

In the event that it is necessary to square off the forward ends of the tubes before cutting the first blanks therefrom, the auxiliary stop bar 100 may be employed for the squaring off operation in order to reduce the amount of scrap which results therefrom. When so employed, the bar 100 is manually shifted to its uppermost position before placing the tubes on the inclined support. In this position, the bar 100 serves as a stop for the forward ends of the tubes until they are clamped to the front supporting bar 25, after which the bar 100 is manually shifted to its lowermost or inoperative position. Since the bar 100 is considerably closer to the path of the cutting wheel than the stop bar 35, the amount of scrap which results from squaring off the ends of the tubes is reduced considerably when the bar 100 is employed instead of stop bar 35 during the squaring off cutting operation.

It is to be understood that the invention is not limited to the particular embodiments thereof herein illustrated and described, except insofar as is defined by the appended claims.

What is claimed is:

1. The method of severing glass tubing, which comprises the steps of arranging a plurality of glass tubes in parallel relationship and in a common plane, and then moving a rotating cutting wheel across the tubes and in contact therewith to "nick" and simultaneously vibrate each tube and thereby cause a complete separation thereof at the point where it is "nicked."

2. In an apparatus for severing glass tubing, a support for holding a plurality of glass tubes in spaced parallel relationship, said support being inclined sufficiently to permit endwise movement of the tubes under the force of gravity, a retractable stop bar engageable by the forward ends of the tubes to limit the endwise movement thereof, a movable clamping bar for clamping the tubes to the support, means for moving the clamping bar to its clamping position and for thereafter retracting the stop bar, and means for "nicking" the tubes along a line transversely thereof and adjacent said clamping bar, said last mentioned means being capable of vibrating said tubes to completely separate the forward end portions thereof at the points where they are "nicked."

3. In an apparatus for severing glass tubing, a support for the tubing, means for locating the tubing on the support so that an end portion thereof overhangs the support, a normally ineffective auxiliary support adapted to be elevated to a position in which it serves as a rest for the said end portion of the tubing, and means for severing said end portion at a point intermediate the two supports.

4. In an apparatus for severing glass tubing, an inclined support along which the tubing is endwise movable under the force of gravity, a stop bar spaced from the lower end of said support and engageable by the forward end of the tubing to limit the endwise movement thereof, and an auxiliary stop and supporting bar interposed between said first mentioned support and stop bar, said auxiliary bar being movable to one position to serve as a stop for engagement by the forward end of the tubing and to another position to support the forward end portion of the tubing.

5. In an apparatus for severing glass tubing, a support for holding a plurality of glass tubes in parallel relationship and in a common plane, and a rotating cutting wheel movable transversely of the tubes while in contact therewith, said cutting wheel being adapted to "nick" and simultaneously vibrate each tube and thereby cause a complete separation thereof at the point where it is "nicked."

6. The method of severing glass tubing and the like, which comprises the steps of arranging a plurality of glass tubes in parallel relationship and in a common plane, and then moving across the tubes and in contact therewith a glass severing means capable of "nicking" and simultaneously vibrating the tubes in succession, whereby each tube is completely separated at the point where it is "nicked."

7. The method of severing glass tubing, which comprises the steps of arranging a plurality of glass tubes on a support with their longitudinal axes disposed in parallel relationship in a common plane, yieldably clamping the tubes thus arranged on the support, and then moving a rotating cutting wheel across the tubes and in contact therewith to "nick" and simultaneously vibrate each tube and thereby cause a complete separation thereof at the point where it is "nicked."

8. The method of severing glass tubing, which comprises the steps of arranging a plurality of glass tubes on an inclined support with their longitudinal axes disposed in parallel relationship in a common plane and with one end of each tube engaging a retractable stop, yieldably clamping the tubes thus arranged on the support, then retracting the stop from the ends of the tubes, and then moving a rotating cutting wheel across the tubes and in contact therewith to sever a portion from the said end of each tube.

9. The method of severing glass tubing, which comprises the steps of arranging a plurality of glass tubes on an inclined support with their longitudinal axes disposed in parallel relationship in a common plane and with one end of each tube engaging a retractable stop, yieldably clamping the tubes to the support, retracting the stop from the ends of the clamped tubes, moving a rotating cutting wheel across the clamped tubes and in contact therewith to sever a portion from the said end of each tube, and then returning the stop to its operative position and releasing the tubes to permit them to advance by gravity along the inclined support until the previously severed ends of the tubes engage the stop.

10. The method of severing glass tubing, which comprises the steps of yieldably clamping to a support a plurality of glass tubes with their longitudinal axes disposed in parallel relationship in a common plane and with an end portion of each tube overhanging the support, and then moving a rotating cutting wheel across the overhanging portions of the tubes and in contact therewith to "nick" and simultaneously vibrate the said portions of the tubes and thereby cause a complete separation thereof at the point where it is "nicked."

11. In an apparatus of the class described, a support for holding a plurality of glass tubes with their axes in parallel relationship and in a common plane, means for clamping the tubes to the support with an end portion of each tube overhanging the support, a rotary cutting wheel, means for rotating the cutting wheel, and means for moving the cutting wheel, while rotated, across the overhanging end portions of the tubes along a line adjacent the support to sever said overhanging portions of the tubes from the remainder of the tubes.

12. In an apparatus of the class described, a support for holding a plurality of glass tubes with their axes in parallel relationship and in a common plane, a retractable stop arranged to be engaged by an end of each tube, means for clamping the tubes to the support with the said ends thereof engaging said stop and for thereafter retracting the stop, and a rotating cutting wheel movable transversely of the tubes along a line spaced from the said ends thereof, said cutting wheel being adapted to "nick" and simultaneously vibrate each tube and thereby cause a complete separation thereof at the point where it is "nicked."

13. In an apparatus for severing glass tubing, a support for the tubing, a retractable stop associated with the support for engagement by an end of the tubing, a clamp for clamping the tubing to the support, actuating means movable in one direction for moving said clamp to its clamping position, a yieldable connection between said clamp and said actuating means for permitting an additional movement of said clamp actuating means in said direction after said clamp has been moved to its clamping position, means operated by said actuating means during said additional movement thereof for retracting said stop, and means for severing the tubing.

14. In an apparatus for severing glass tubing, a support for the tubing, a retractable stop associated with the support for engagement by an end of the tubing, yieldable means normally holding the stop in its operative position, a reciprocatory clamp for clamping the tubing to the support with an end thereof engaging the stop, a reciprocatory clamp actuating member adapted, when moved in one direction, to move said clamp to its clamping position, a yieldable connection between said clamp and said clamp actuating member for permitting an additional movement of said clamp actuating member in said direction after said clamp has been moved to its clamping position, means actuated by said clamp actuating member during said additional movement thereof for retracting the said stop from its operative position, and means for severing the tubing.

15. In an apparatus of the class described, a support for holding a plurality of glass tubes arranged in spaced parallel relationship with their axes in a common plane, said support being inclined so that the tubes are endwise movable thereon under the force of gravity and said support including a stationary clamp bar disposed transversely of the supported tubes at the lower end of the support, a retractable stop bar arranged for engagement by an end of each tube to limit the movement of the tubes along the support, said stop bar being spaced from the lower edge of the support so that an end portion of each tube overhangs the support when the tubes are in engagement with said stop bar, means for yieldably holding the stop bar in its operative position, a reciprocatory clamp bar for clamping the tubes to the stationary clamp bar, a reciprocatory clamp actuating member adapted, when moved in one direction, to move said reciprocatory clamp bar to its clamping position, a yieldable connection between said clamp actuating member and said reciprocatory clamp bar for permitting an additional movement of the clamp actuating member in said direction after the reciprocatory clamp bar has been moved to its clamping position, means actuated by said clamp actuating member during said additional movement thereof for retracting the stop bar from its operative position, and a rotary cutting wheel mounted for movement across the overhanging end portions of the tubes along a line adjacent the clamp bars for severing said tube portions from the remaining portions of the tubes.

16. In an apparatus for severing glass tubing, a support for the tubing, a stop bar for engagement by an end of the tubing to locate the tubing on the support with an end portion of the tubing overhanging the support, and a normally ineffective auxiliary stop bar adapted to be moved to a tube stopping position intermediate the first mentioned stop bar and said support.

17. In an apparatus of the class described, a support for holding a plurality of glass tubes in parallel relationship and in a common plane, a carriage mounted for movement transversely of the tubes, a slide on the carriage, a rotating cutting wheel carried by the slide, spring means urging the slide in one direction, and means for moving the slide in the opposite direction to adjust the position of the cutting wheel relative to the tubes on the support.

JAMES W. JUVINALL.